United States Patent [19]

Pauley

[11] Patent Number: 5,251,435
[45] Date of Patent: Oct. 12, 1993

[54] REVERSER INNER COWL WITH INTEGRAL BIFURCATION WALLS AND CORE COWL

[75] Inventor: Gerald A. Pauley, Hamilton, Ohio

[73] Assignee: General Electric Company, Cincinnati, Ohio

[21] Appl. No.: 784,855

[22] Filed: Oct. 30, 1991

[51] Int. Cl.$^5$ ............................................. F02K 3/02
[52] U.S. Cl. ................................. 60/226.1; 601/39.31; 601/226.2; 244/54
[58] Field of Search ................... 60/226.1, 39.31, 262, 60/226.2; 244/54

[56] References Cited

U.S. PATENT DOCUMENTS

| | | | |
|---|---|---|---|
| 2,815,184 | 12/1957 | Westphal et al. | 244/54 |
| 3,347,578 | 10/1967 | Sheehan et al. | 244/54 |
| 3,541,794 | 11/1970 | Johnston | 60/226 |
| 4,037,809 | 7/1977 | Legrand | 244/54 |
| 4,038,118 | 7/1977 | James | 244/54 |
| 4,043,522 | 8/1977 | Vetter | 244/54 |
| 4,177,639 | 12/1979 | Taylor | 60/226.2 |
| 4,585,189 | 4/1986 | Buxton | 244/54 |
| 4,732,535 | 3/1988 | Tubbs | 60/226.2 |
| 4,790,137 | 12/1988 | Quinn | 60/226.1 |
| 4,826,106 | 5/1989 | Anderson | 244/117 R |
| 4,930,307 | 6/1990 | Newton | 60/226.2 |
| 5,060,471 | 10/1991 | Torkelson | 60/262 |
| 5,083,426 | 1/1992 | Layland | 60/226.1 |
| 5,101,621 | 4/1992 | Mutch | 60/226.1 |

FOREIGN PATENT DOCUMENTS

0132214 1/1985 European Pat. Off. .............. 244/54

OTHER PUBLICATIONS

"Processing of PMR-15 Prepregs for High Temperature Composites", Plastics Engineering, Jan. 1990, pp. 27-30.
"Design Features Of The CF6 Engine Thrust Reverser And Spoiler" by Dean J. Lennard; Society of Automotive Engineers, National Air Transportation Meeting, New York, Apr. 21-24, 1969.

Primary Examiner—Richard A. Bertsch
Assistant Examiner—Howard R. Richman
Attorney, Agent, or Firm—Jerome C. Squillaro

[57] ABSTRACT

A one piece inner cowling for a bifurcated fan duct is provided having an integral core cowl and radially extending bifurcation sidewalls for use in a bifurcated fan bypass duct of a turbofan engine. In the preferred embodiment the sidewalls extend substantially to the end of the fan duct and the core cowl extends substantially between the fan and turbine frames. The cowling is preferably made of a composite material, preferably graphite/PMR-15 and provisions are made for mechanically attaching the sidewalls to an outer cowl. The inner cowling and outer cowl assembly form one half of a bifurcated fan duct assembly for being pivotally attached to a turbofan mounting pylon and includes suitable latching apparatus for accessing the core engine by pivotally opening the mirror image bifurcated fan duct assemblies on either side of the engine.

16 Claims, 3 Drawing Sheets

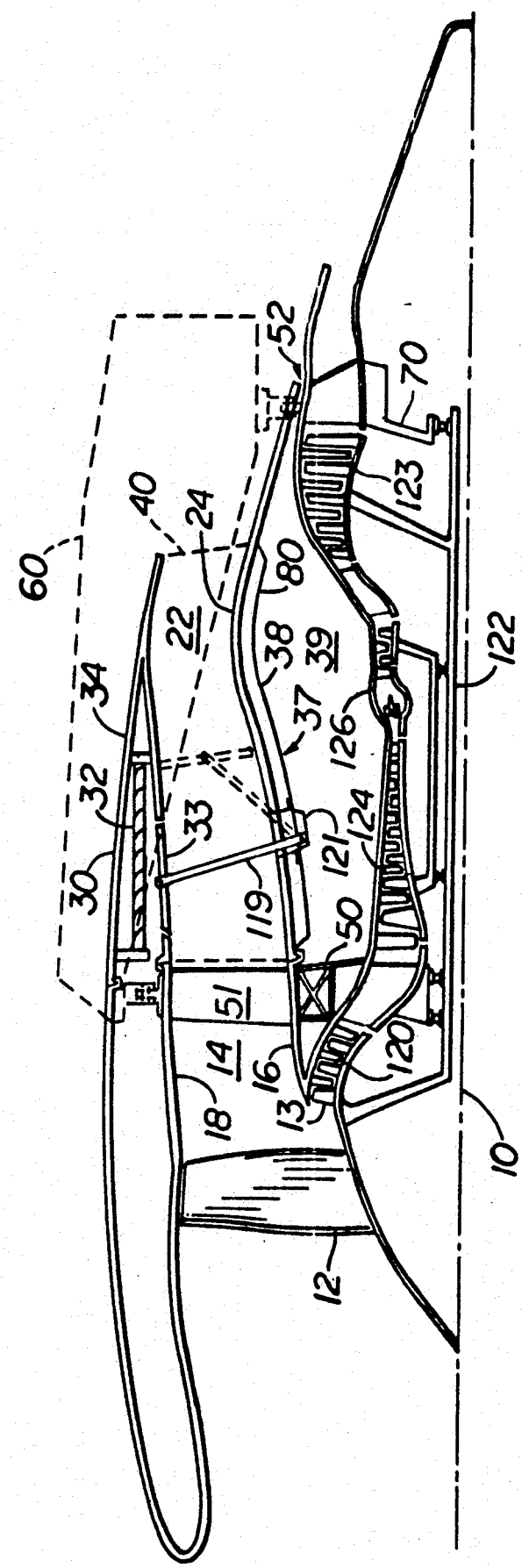

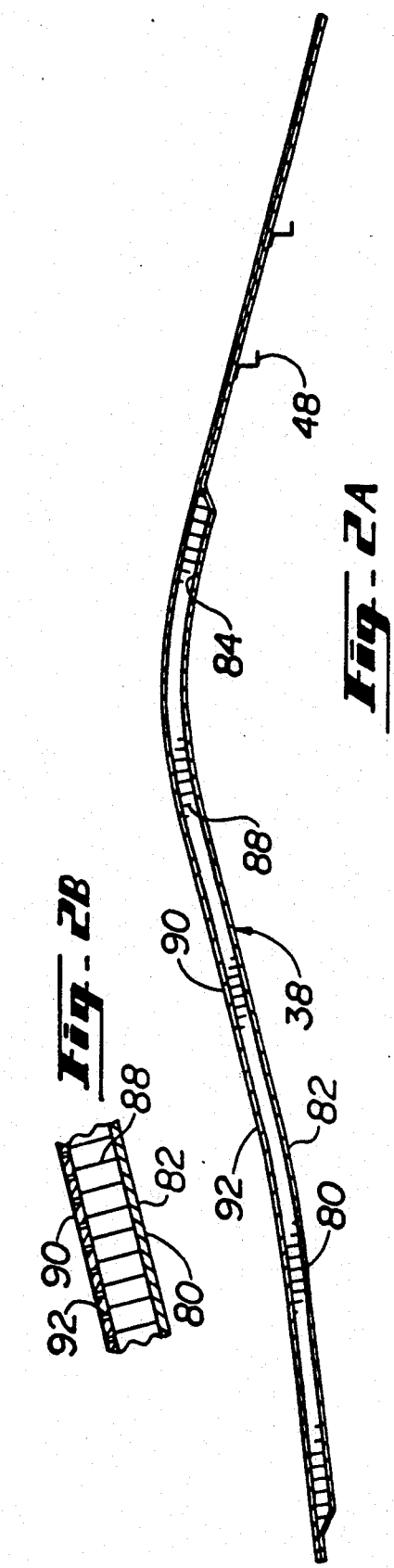
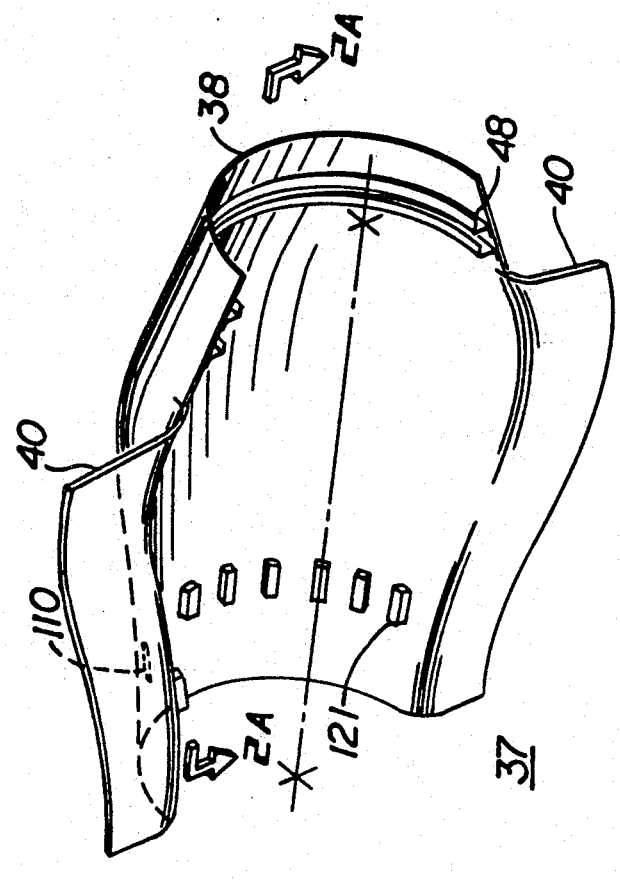

REVERSER INNER COWL WITH INTEGRAL BIFURCATION WALLS AND CORE COWL

BACKGROUND OF THE INVENTION

1. Field of the Invention

This invention relates to aircraft turbofan engine fan duct reversers and cowls and particularly to bifurcated fan ducts where the inner and outer duct walls are constructed as a single assembly and tied together by radially extending sidewalls to form a cowl.

2. Description of Related Art

Aircraft turbofan engines typically include a fan bypass duct where the majority of the air pressurized by the fan is passed though and which typically includes a fan nozzle for producing thrust from the fan pressurized bypass air. The remaining air is passed through the core engine in which it is used as the working fluid to help generate power for the fan. Surrounding the fan duct is an outer cowl and surrounding the core engine cavity is an inner cowling that is split into two portions, forward and aft, wherein the aft portion may be referred to as a core engine cowl that extends aft till about the end of the turbine section of the engine. Between the radially inner and outer cowls is the fan duct including at its exit a fan nozzle.

An aerodynamically clean fan duct, one that is smooth, designed to prevent flow separation, and aerodynamically shaped for minimum pressure and flow losses, is important to the efficient operation of the aircraft. Typical fan ducts are constructed of aluminum sheet metal that is light weight and suitable for forming the aerodynamically contoured shape of the fan duct and its walls, particularly of its nozzle. The sheet metal fabrication is typically accomplished using rivets and is often attached to a minimal frame structure for rigidity.

Turbofan engines often have thrust reverser apparatus mounted within the outer cowl as described in U.S. Pat. No. 3,541,794 entitled "Bifurcated Fan Duct Thrust Reverser", by Johnston et. al., issued Nov. 24, 1970, assigned to the same assignee, and incorporated herein by reference. Johnston notes that the need to have thrust reversers rigidly secured to the fan casing surrounding the fan duct makes access to the core engine difficult. To that end Johnston discloses a bifurcated fan duct having two semi-circular fan ducts that are substantially mirror images of each other. Each semi-circular duct has radially spaced apart generally arcuate inner and outer walls connected by rivets, welding, or the like to radially extending sidewalls at the circumferential ends of the inner and outer walls.

The core engine cowling is provided by two axially extending sections, the first an inner wall of the fan ducts and the second or aft section an aft or core engine cowl. A fan cowling is provided by two axially extending sections where the aft section is the outer wall of the bifurcated fan duct. The outer wall is a fan reverser cowl containing fan thrust reverser apparatus including actuating mechanisms, turning vane cascades, and stowed blocker doors.

Previous fan duct assemblies have been fabricated using rivets for attaching sheet metal forming the wetted aerodynamic surfaces made of the duct. This type of construction has several inherent drawbacks. The design is inherently heavy and the aluminum used in the fabricated assembly requires insulation blankets and thermal barriers to protect the duct from the heat of the engine and for fire protection. This further adds to the weight of the engine and makes access to the core engine more difficult.

The rivet heads protruding from the surface of the fan duct walls into the fan bypass airflow causes flow and pressure losses which reduce engine fuel efficiency. A fabricated duct, one made of an assembly of parts, is less rigid and weighs more than a single continuous duct constructed of a composite material such as the present invention.

The term composite, for the purposes of this invention, denotes a material containing a fiber such as a carbonaceous, silica, metal, metal oxide, or ceramic fiber embedded in a resin material such as Epoxy, PMR-15, BMI, PEEU, etc. of particular use are fibers woven into cloth that is impregnated with a resin and cured via an autoclaving process or press molding to form a hard relatively homogeneous article. The composite suggested in the preferred embodiment is a graphite woven cloth impregnated with a PMR-15 polyimide resin, this includes tape as well as fabric. A discussion of this material may be found in an article in the January 1990 issues of Plastics Engineering, entitled "Processing of PMR-15 Prepregs for High Temperature Composites", by Mel Kaniz, which is incorporated herein by reference. Further information concerning suitable materials and definitions may be found in the "Engineering Material& Handbook" by ASM INTERNATIONAL, 1987–1989 or later editions, which is incorporated herein by reference.

SUMMARY OF THE INVENTION

This invention relates to aircraft turbofan gas turbine engines fan ducts generally defined between the fan and core engine cowls. The invention provides for smooth fan air flow with a minimum degree of airflow losses in the fan duct as well as a strong, light weight, fire resistant core engine cowl providing ease of access to the core engine.

The present invention provides a one piece inner cowling having an integral fan duct inner cowl and core cowl and radially extending bifurcation sidewalls for use in a bifurcated fan bypass duct. The sidewalls extend substantially to the end of the fan duct and the inner cowling extends substantially to the end of the core engine turbine section. The inner cowling is preferably made of a composite material, preferably graphite/PMR-15. The sidewalls are designed for mechanical attachment to an outer fan cowl which is, in the preferred embodiment, a fan thrust reverser cowl including fan thrust reverser apparatus. This forms a fan duct assembly which is pivotally attached to a turbofan mounting pylon and includes suitable latching apparatus for accessing the core engine by pivotally opening the mirror image fan duct assemblies on either side of the engine.

The present invention provides smoother surfaces for the fan bypass air to travel over thereby improving fuel efficiency of the turbofan engine due to lower fan duct airflow losses. The one piece construction of the inner cowling integrates the fan duct inner cowl and core cowl for ease of access to the core engine for repair and maintenance procedures thereby enhancing the engines maintainability and reducing the operating cost of the engine. The composite construction is lighter weight than previous cowls design which also improves fuel efficiency of the engine. The composite structure is easier to manufacture and provides sufficient fire proofing to eliminate the need for additional layers of fire protection material.

The integral one piece core cowl and sidewalls is stronger than prior designs which incorporate two piece core cowls having forward and aft portions. This feature is stronger and allows load sharing by the cowl if so desired. The bifurcated continuous one piece construction of the cowling and sidewalls provide additional rigidity and durability for the engine and engine components. The improved rigidity provides for better control of the rotor tip clearances which allows the engine to be designed and operated with closer tolerances of the clearances between the rotor tips and static parts of the engine against which they seal. This advantage provides additional fuel efficiency and or engine and engine component life.

BRIEF DESCRIPTION OF THE DRAWINGS

The foregoing aspects and other features of the invention are explained in the following description, taken in connection with the accompanying drawings where:

FIG. 1 is a cross-sectional view of a fan-jet engine having one piece bifurcated fan ducts with an inner cowling having integral core cowl and sidewalls in accordance with the preferred embodiment of the present invention.

FIG. 2 is a perspective view of an inner cowling and sidewalls illustrated in FIG. 1.

FIG. 2A is a cross-sectional view of the inner cowling and sidewalls illustrated in FIG. 1.

FIG. 2B is an exploded cross-sectional view of a portion of the inner cowling illustrated in FIG. 1.

DETAILED DESCRIPTION OF THE INVENTION

Figure 3:
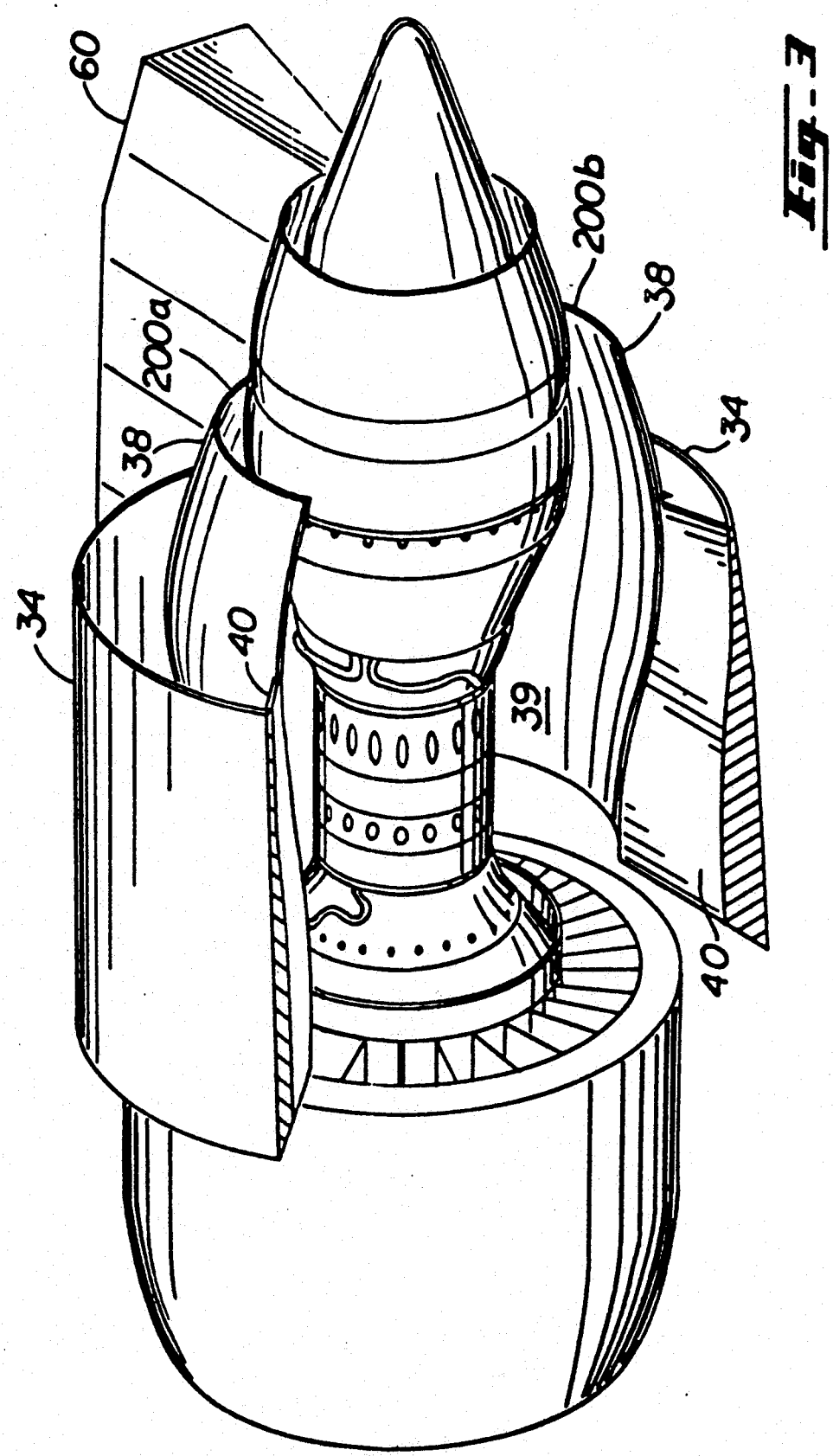
FIG. 3 is a perspective view of the engine in FIG. 1 showing a one piece bifurcated fan duct with an open inner cowling illustrating ease of access to a core engine cavity.

This invention is specific to a fan-jet engine of the type exemplified by the GE CF6, CFM, and soon to be manufactured GE90 series of engines by General Electric, the assignee of this patent application. Illustrated in FIG. 1 is a fan-jet engine 10 having a fan 12 that pressurizes and feeds air to a fan bypass duct 14 disposed between inner fan case 16 and outer fan case 18 and to booster 120 located at a forward portion of core engine flow path 13. Fan air is exhausted from bypass duct 14 through a fan nozzle generally shown at 22 having a throat 24. Booster 120 rotates together with fan 12 on a low pressure rotor 122 driven by a conventional low pressure turbine 123 and further compresses air that is then ducted to a conventional core engine compressor 124 of a core engine 126.

A fan frame 50 mounted to a wing (not shown) by a pylon 60 by way of fan strut 51, indicated by a dotted line because it is out of plane, provides forward bearing support for the rotors while turbine frame 70 provides aft bearing support for the rotors. Core engine 126 is generally disposed in a core engine cavity 39 circumscribed by an annular inner cowl 38 also referred to as a core engine cowl.

A bifurcated fan duct thrust reverser assembly 30 includes an annular outer cowl 34 and an annular inner cowl 38 and bifurcation sidewalls 40, one of which is shown in dotted line because it is out of plane, radially extending therebetween at the circumferential ends of cowls 34 and 38. Outer cowl 34 also contains a conventional thrust reverser indicated by translating cowl and turning vane cascade 32 and employing blocker doors 33 which are deployed with the assistance of a drag link 119 pivotally mounted to inner cowl 38.

The present invention provides a bifurcated fan duct apparatus generally shown at 37 having an integral single piece inner cowl 38 and sidewalls 40 whereby inner cowl 38 generally extends axially between fan frame 50 and turbine frame 70. The aft end 52 of inner cowl 38 preferably ends at and partially forms a core engine cavity vent. Sidewalls 40 generally extend axially from the forward end of inner cowl 38 to the end of fan duct 14.

Shown in FIG. 2, a more detailed illustration of the preferred embodiment of the present invention, is bifurcated fan duct apparatus generally shown at 37 having a cowling including an integral single piece inner cowl 38, sidewalls 40, and circumferentially disposed stiffener rings 48. The cowling is, in the preferred embodiment, formed from a composite material preferably a graphite fiber and PMR-15 resin denoted as graphite/PMR-15 herein. Link apertures 110 are cut out and linkage boxes 121 bonded around the apertures to provide a pivotal connection for drag link 119 shown in FIG. 1. Noise attenuation treatment generally shown at 80 in the form of sectors of perforated cells may be bonded to the inside of inner cowl 38.

FIG. 2A more clearly points out the construction of inner cowl 38. Inner cowl 38 is formed from an inner skin 82 which is made from graphite/PMR-15 and cured before bonding assembly of inner cowl 38. Inner skin 82 includes a depression 84 to accept conventional acoustical attenuating honeycomb cell layer 88. An outer skin 90, made from PMR-15 and cured before assembly of inner cowl 38 by bonding, is predrilled with conventional perforations 92 to cooperate with honeycomb cells in layer 88 to provide acoustical noise treatment 80, see FIG. 2B for details.

Stiffener rings 48 are z shaped, other suitable shapes may be used, and made from graphite/PMR-15 and cured before bonding assembly of inner cowl 38. The bonding process for assembling inner and outer skins 82 and 90 respectively, noise attenuating honeycomb cell layer 88, and stiffener rings 48 to form inner cowl 38 is done at the same time using a single bonding fixture to hold all these elements.

Bifurcated fan duct apparatus 37 contemplates provisions for attaching outer cowl 34, along its interface with, to sidewalls 40 to form a pivotal integral bifurcated fan duct reverser cowl and core cowl. Pivoting means are contemplated similar to that shown in the Johnston patent referenced earlier as can be more clearly seen in FIG. 3.

FIG. 3 illustrates ease of access to core engine cavity 39 by lifting right and left handed bifurcated fan reverser duct assemblies 200a and 200b respectively hinged to pylon 60 and formed by fan thrust reverser outer cowl 34, integral inner cowl 38, and sidewalls 40. Apparatus and methods for pivotally mounting and latching bifurcated fan reverser duct assemblies 200a and 200b are known in the art such as those shown in the Johnston patent referenced above.

While the preferred and an alternate embodiment of our invention has been described fully in order to explain its principles, it is understood that various modifications or alterations may be made to the preferred embodiment without departing from the scope of the invention as set forth in the appended claims.

We claim:

1. A cowling for use in an aircraft turbofan engine having a fan section, a fan frame, and a turbine frame and a bifurcated fan duct including a fan nozzle, said cowling comprising:

a generally semi-circular annular core cowl generally extending axially between the fan frame and the turbine frame of the engine and radially extending fan duct bifurcation sidewalls at circumferentially opposite ends of said core cowl wherein said sidewalls extend axially aftwardly of said fan frame over a first portion of said core cowl said first portion ending at the end of the fan nozzle which lies between the fan frame and turbine frame and a second portion of said core cowl extends axially aftwardly of said sidewalls.

2. A cowling as claimed in claim 1 wherein said core cowl and sidewalls are integrally formed.

3. A cowling as claimed in claim 2 wherein said core cowl and sidewalls are made from a composite material.

4. A cowling as claimed in claim 3 wherein said composite material comprises graphite fibers and a PMR-15 resin.

5. A cowling as claimed in claim 1 wherein said core cowl and sidewalls are made from a composite material.

6. A cowling as claimed in claim 5 further comprising at least one stiffener ring circumferentially disposed inside of said section portion of said core cowl.

7. A cowling as claimed in claim 6 further comprising an acoustical noise treatment circumferentially disposed inside of said second portion of said core cowl.

8. A cowling as claimed in claim 7 wherein said second portion of said core cowl further comprises:

an inner skin spaced apart from an outer skin and a honeycomb material disposed therebetween for said noise acoustical treatment, and a plurality of perforations formed in said outer skin covering said honeycomb material.

9. A cowling as claimed in claim 8 further comprising at least one stiffener ring circumferentially disposed inside of said second portion of said core cowl on said inner skin.

10. A cowling as claimed in claim 9 wherein said stiffener rings are made from a material comprising graphite fibers and a PMR-15 resin.

11. A bifurcated fan duct assembly for use in an aircraft turbofan engine having a fan section, a fan frame, and a turbine frame and a bifurcated fan duct including a fan nozzle, said bifurcated fan duct assembly comprising:

a radially outer fan reverser cowl, a radially inner cowling spaced apart and generally concentric of said fan reverser cowl, said inner cowling including generally semi-circular annular core cowl generally extending axially between the fan frame and the turbine frame of the engine and radially extending fan duct bifurcation sidewalls at circumferentially opposite ends of said core cowl wherein said sidewalls extend axially aftwardly of said fan frame over a first portion of said core cowl and a second portion of said cowl extends axially aftwardly of said sidewalls.

12. A bifurcated fan duct assembly as claimed in claim 11 wherein said core cowl and sidewalls are integrally formed and made from a composite material.

13. A bifurcated fan duct assembly as claimed in claim 11 wherein said core cowl and sidewalls are made from a composite material.

14. A bifurcated fan duct assembly as claimed in claim 12 wherein said core cowl comprises:

an inner skin spaced apart from an outer skin and a honeycomb material disposed therebetween for noise attenuation, a plurality of perforations formed in said outer skin covering said honeycomb material, and said inner and outer skins are made from a composite material.

15. A bifurcated fan duct assembly as claimed in claim 14 further comprising at least one stiffener ring circumferentially disposed inside of said second portion of said core cowl on said inner skin.

16. A bifurcated fan duct assembly as claimed in claim 15 wherein said core cowl and said stiffener rings are made from a material comprising graphite fibers and a PMR-15 resin.

* * * * *